US011393282B2

(12) United States Patent
Bucher et al.

(10) Patent No.: US 11,393,282 B2
(45) Date of Patent: Jul. 19, 2022

(54) SYSTEMS AND DEVICES FOR IDENTIFICATION OF A FEATURE ASSOCIATED WITH A USER IN A GAMING ESTABLISHMENT AND RELATED METHODS

(71) Applicant: SG Gaming, Inc., Las Vegas, NV (US)

(72) Inventors: Timothy Bucher, Geyserville, CA (US); Terrin Eager, Campbell, CA (US); Bryan M. Kelly, Alamo, CA (US); Martin S. Lyons, Henderson, NV (US); Joseph Randolph Hedrick, Reno, NV (US); Scott Thomas Hilbert, Sparks, NV (US); Theodore Keenan, Castro Valley, CA (US); John Link, Manteca, CA (US); Mohan Kumar Areanalli Manju, Pleasanton, CA (US); Yogendrasinh Hematji Rajput, Bangalore (IN)

(73) Assignee: SG Gaming, Inc., Las Vegas, NV (US)

( * ) Notice: Subject to any disclaimer, the term of this patent is extended or adjusted under 35 U.S.C. 154(b) by 148 days.

(21) Appl. No.: 16/794,103

(22) Filed: Feb. 18, 2020

(65) Prior Publication Data
US 2021/0110648 A1 Apr. 15, 2021

(30) Foreign Application Priority Data

Oct. 9, 2019 (IN) .............................. 201941040664

(51) Int. Cl.
*G07F 17/32* (2006.01)
*G06N 20/00* (2019.01)
*G06V 40/16* (2022.01)

(52) U.S. Cl.
CPC ......... *G07F 17/3239* (2013.01); *G06N 20/00* (2019.01); *G06V 40/172* (2022.01); *G07F 17/3206* (2013.01); *G07F 17/3213* (2013.01)

(58) Field of Classification Search
USPC ...................................................... 463/16, 17
See application file for complete search history.

(56) References Cited

U.S. PATENT DOCUMENTS

| 5,103,081 A | 4/1992 | Fisher et al. |
| 5,451,054 A | 9/1995 | Orenstein |
| 5,757,876 A | 5/1998 | Dam et al. |
| 6,460,848 B1 | 10/2002 | Soltys et al. |

(Continued)

FOREIGN PATENT DOCUMENTS

| CN | 201445776 U | 5/2010 |
| CN | 102791340 A | 11/2012 |

(Continued)

OTHER PUBLICATIONS

United Kingdom Examination Report, for United Kingdom, Application No. 201556, dated Mar. 10, 2021, 6 pages.

(Continued)

*Primary Examiner* — Pierre E Elisca
(74) *Attorney, Agent, or Firm* — TraskBritt

(57) ABSTRACT

Methods and systems of monitoring at least one feature associated with a patron in a gaming establishment. Such methods and systems may include detecting at least one physical feature associated with the patron and/or motions of one or more players participating in a game.

25 Claims, 6 Drawing Sheets

(56) References Cited

U.S. PATENT DOCUMENTS

| | | |
|---|---|---|
| 6,514,140 B1 | 2/2003 | Storch |
| 6,517,435 B2 | 2/2003 | Soltys et al. |
| 6,517,436 B2 | 2/2003 | Soltys et al. |
| 6,520,857 B2 | 2/2003 | Soltys et al. |
| 6,527,271 B2 | 3/2003 | Soltys et al. |
| 6,530,836 B2 | 3/2003 | Soltys et al. |
| 6,530,837 B2 | 3/2003 | Soltys et al. |
| 6,533,276 B2 | 3/2003 | Soltys et al. |
| 6,533,662 B2 | 3/2003 | Soltys et al. |
| 6,579,180 B2 | 6/2003 | Soltys et al. |
| 6,579,181 B2 | 6/2003 | Soltys et al. |
| 6,595,857 B2 | 7/2003 | Soltys et al. |
| 6,663,490 B2 | 12/2003 | Soltys et al. |
| 6,688,979 B2 | 2/2004 | Soltys et al. |
| 6,712,696 B2 | 3/2004 | Soltys et al. |
| 6,722,985 B2 | 4/2004 | Criss-Puszkiewicz et al. |
| 6,758,751 B2 | 7/2004 | Soltys et al. |
| 6,846,238 B2 | 1/2005 | Wells |
| 6,896,618 B2 | 5/2005 | Benoy et al. |
| 6,979,264 B2 | 12/2005 | Chatigny et al. |
| 7,011,309 B2 | 3/2006 | Soltys et al. |
| 7,124,947 B2 | 10/2006 | Storch |
| 7,125,335 B2 | 10/2006 | Rowe |
| 7,159,765 B2 | 1/2007 | Frerking |
| 7,316,615 B2 | 1/2008 | Soltys et al. |
| 7,329,186 B2 | 2/2008 | Griswold et al. |
| 7,350,696 B2 | 4/2008 | Frerking |
| 7,506,172 B2 | 3/2009 | Bhakta |
| 7,611,411 B2 | 11/2009 | Griswold et al. |
| 7,753,781 B2 | 7/2010 | Storch |
| 7,771,272 B2 | 8/2010 | Soltys et al. |
| 7,780,526 B2 | 8/2010 | Nguyen et al. |
| 7,850,528 B2 | 12/2010 | Wells |
| 7,867,083 B2 | 1/2011 | Wells et al. |
| 7,871,329 B2 | 1/2011 | Rowe |
| 7,909,692 B2 | 3/2011 | Nguyen et al. |
| 8,002,619 B2 | 8/2011 | Gagner et al. |
| 8,079,905 B2 | 12/2011 | Nguyen et al. |
| 8,123,616 B2 | 2/2012 | Wells et al. |
| 8,130,097 B2 | 3/2012 | Knust et al. |
| 8,243,929 B2 | 8/2012 | Wells et al. |
| 8,251,806 B2 | 8/2012 | Chatigny et al. |
| 8,282,478 B2 | 10/2012 | Lyons |
| 8,285,034 B2 | 10/2012 | Rajaraman et al. |
| 8,298,078 B2 | 10/2012 | Sutton et al. |
| 8,308,562 B2 | 11/2012 | Patton |
| 8,353,764 B2 | 1/2013 | Williams et al. |
| 8,430,749 B2 * | 4/2013 | Nelson ............... G06Q 30/02 463/29 |
| 8,469,260 B2 | 6/2013 | Lyons et al. |
| 8,556,714 B2 | 10/2013 | Bowers et al. |
| 8,602,885 B2 | 12/2013 | Arezina et al. |
| 8,606,002 B2 | 12/2013 | Arbogast et al. |
| 8,608,567 B2 | 12/2013 | Gatto et al. |
| 8,644,564 B1 | 2/2014 | Patton et al. |
| 8,701,981 B2 | 4/2014 | Lyons et al. |
| 8,758,102 B2 | 6/2014 | Block et al. |
| 8,764,572 B2 | 7/2014 | Nguyen et al. |
| 8,821,274 B2 | 9/2014 | Lyons et al. |
| 8,851,984 B2 | 10/2014 | Lyons |
| 8,896,444 B1 | 11/2014 | Knust et al. |
| 8,972,299 B2 | 3/2015 | Kelly |
| 9,033,785 B2 | 5/2015 | Walker et al. |
| 9,111,418 B2 | 8/2015 | Arumugam et al. |
| 9,146,940 B2 | 9/2015 | Schlieski et al. |
| 9,165,420 B1 | 10/2015 | Knust et al. |
| 9,165,421 B2 | 10/2015 | Lyons et al. |
| 9,174,114 B1 | 11/2015 | Knust et al. |
| 9,269,216 B2 | 2/2016 | Keilwert |
| 9,269,219 B2 | 2/2016 | Lyons et al. |
| 9,330,523 B2 | 5/2016 | Sutton et al. |
| 9,355,519 B2 | 5/2016 | Lyons et al. |
| 9,378,605 B2 | 6/2016 | Koyama |
| 9,443,382 B2 | 9/2016 | Lyons |
| 9,511,275 B1 | 12/2016 | Knust et al. |
| 9,511,291 B2 | 12/2016 | Lyons et al. |
| 9,519,762 B2 | 12/2016 | Williams et al. |
| 9,558,612 B2 | 1/2017 | Lyons et al. |
| 9,573,053 B2 | 2/2017 | Aoki et al. |
| 9,626,807 B2 | 4/2017 | Lyons et al. |
| 9,659,447 B2 | 5/2017 | Lyons et al. |
| 9,679,437 B2 | 6/2017 | Detlefsen et al. |
| 9,697,676 B2 | 7/2017 | Arumugam et al. |
| 9,697,683 B2 | 7/2017 | Lyons et al. |
| 9,795,870 B2 | 10/2017 | Ratliff |
| 9,858,754 B2 | 1/2018 | Lyons et al. |
| 9,865,125 B2 | 1/2018 | Lyons et al. |
| 9,875,598 B2 | 1/2018 | Lyons et al. |
| 9,875,600 B2 | 1/2018 | Arumugam et al. |
| 9,889,371 B1 | 2/2018 | Knust et al. |
| 9,940,788 B2 | 4/2018 | Lyons et al. |
| 9,965,988 B2 | 5/2018 | Lyons et al. |
| 10,032,335 B2 | 7/2018 | Shigeta |
| 10,046,232 B2 | 8/2018 | Aoki et al. |
| 10,096,198 B2 | 10/2018 | Griswold et al. |
| 10,096,206 B2 | 10/2018 | Bulzacki et al. |
| 10,134,195 B2 | 11/2018 | Lyons et al. |
| 10,134,229 B2 | 11/2018 | Lyons et al. |
| 10,192,085 B2 | 1/2019 | Shigeta |
| 10,204,471 B2 | 2/2019 | Lyons et al. |
| 10,204,476 B2 | 2/2019 | Arumugam et al. |
| 10,223,859 B2 | 3/2019 | Massing et al. |
| 10,242,525 B1 | 3/2019 | Knust et al. |
| 10,242,527 B2 | 3/2019 | Bulzacki et al. |
| 10,380,838 B2 | 8/2019 | Bulzacki et al. |
| 10,380,844 B2 | 8/2019 | Lech |
| 10,398,202 B2 | 9/2019 | Shigeta |
| 10,403,090 B2 | 9/2019 | Shigeta |
| 10,410,066 B2 | 9/2019 | Bulzacki et al. |
| 10,493,357 B2 | 12/2019 | Shigeta |
| 10,529,183 B2 | 1/2020 | Shigeta |
| 10,540,846 B2 | 1/2020 | Shigeta |
| 10,580,254 B2 | 3/2020 | Shigeta |
| 10,593,154 B2 | 3/2020 | Shigeta |
| 10,600,279 B2 | 3/2020 | Shigeta |
| 10,600,282 B2 | 3/2020 | Shigeta |
| 10,665,054 B2 | 5/2020 | Shigeta |
| 10,706,675 B2 | 7/2020 | Shigeta |
| 10,720,013 B2 | 7/2020 | Main |
| 10,741,019 B2 | 8/2020 | Shigeta |
| 10,748,378 B2 | 8/2020 | Shigeta |
| 10,755,524 B2 | 8/2020 | Shigeta |
| 10,755,525 B2 | 8/2020 | Shigeta |
| 10,762,745 B2 | 9/2020 | Shigeta |
| 10,825,288 B1 | 11/2020 | Knust et al. |
| 10,832,517 B2 | 11/2020 | Bulzacki et al. |
| 10,846,980 B2 | 11/2020 | French et al. |
| 10,846,985 B2 | 11/2020 | Shigeta |
| 10,846,986 B2 | 11/2020 | Shigeta |
| 10,846,987 B2 | 11/2020 | Shigeta |
| 2004/0166931 A1 | 8/2004 | Criss-Puszkiewicz et al. |
| 2005/0059479 A1 | 3/2005 | Soltys et al. |
| 2005/0077995 A1 * | 4/2005 | Paulsen ............... G07C 9/257 340/5.6 |
| 2005/0101368 A1 | 5/2005 | Thomas |
| 2006/0019739 A1 | 1/2006 | Soltys et al. |
| 2006/0046842 A1 | 3/2006 | Mattice et al. |
| 2007/0087834 A1 * | 4/2007 | Moser ............... G07F 17/3255 463/42 |
| 2007/0271113 A1 * | 11/2007 | Nelson ............... G07F 17/3237 705/1.1 |
| 2009/0055204 A1 * | 2/2009 | Pennington ......... G07F 17/3241 348/169 |
| 2009/0124376 A1 | 5/2009 | Kelly et al. |
| 2009/0143141 A1 | 6/2009 | Wells et al. |
| 2009/0176565 A1 | 7/2009 | Kelly |
| 2010/0016056 A1 * | 1/2010 | Thomas ............... G07F 17/3267 463/20 |
| 2011/0065496 A1 | 3/2011 | Gagner et al. |
| 2011/0212771 A1 | 9/2011 | Carr-Gregg et al. |
| 2011/0269520 A1 * | 11/2011 | Amaitis ............... G06F 17/40 463/16 |
| 2012/0063651 A1 * | 3/2012 | Pennington ......... G07F 17/3239 382/118 |

(56) References Cited

U.S. PATENT DOCUMENTS

| | | |
|---|---|---|
| 2012/0118947 A1 | 5/2012 | Lyons et al. |
| 2012/0122528 A1 | 5/2012 | Lyons et al. |
| 2012/0122529 A1 | 5/2012 | Lyons |
| 2012/0330740 A1* | 12/2012 | Pennington .............. G07F 17/32 705/14.27 |
| 2013/0210517 A1 | 8/2013 | Agarwal et al. |
| 2013/0231180 A1 | 9/2013 | Kelly et al. |
| 2013/0244742 A1* | 9/2013 | Amaitis ................ G06Q 50/10 463/13 |
| 2013/0265333 A1 | 10/2013 | Ainsworth et al. |
| 2013/0274007 A1 | 10/2013 | Hilbert et al. |
| 2014/0092005 A1 | 4/2014 | Anderson et al. |
| 2014/0357361 A1 | 12/2014 | Rajaraman |
| 2017/0076549 A1 | 3/2017 | Lech |
| 2017/0087465 A1 | 3/2017 | Lyons et al. |
| 2017/0161985 A1 | 6/2017 | Jacques et al. |
| 2017/0263077 A1 | 9/2017 | Lyons et al. |
| 2018/0053377 A1 | 2/2018 | Shigeta |
| 2018/0061178 A1 | 3/2018 | Shigeta |
| 2018/0068525 A1 | 3/2018 | Shigeta |
| 2018/0075698 A1 | 3/2018 | Shigeta |
| 2018/0089927 A1 | 3/2018 | Anderson |
| 2018/0089935 A1 | 3/2018 | Froy, Jr. |
| 2018/0089939 A1 | 3/2018 | Lyons et al. |
| 2018/0114406 A1 | 4/2018 | Shigeta |
| 2018/0190176 A1 | 7/2018 | Lyons et al. |
| 2018/0211110 A1 | 7/2018 | Shigeta |
| 2018/0211472 A1 | 7/2018 | Shigeta |
| 2018/0225921 A1 | 8/2018 | Lyons et al. |
| 2018/0232987 A1 | 8/2018 | Shigeta |
| 2018/0239984 A1 | 8/2018 | Shigeta |
| 2018/0336757 A1 | 11/2018 | Shigeta |
| 2019/0043302 A1 | 2/2019 | Lyons et al. |
| 2019/0043309 A1 | 2/2019 | Shigeta |
| 2019/0051094 A1 | 2/2019 | Russ et al. |
| 2019/0051100 A1 | 2/2019 | Russ et al. |
| 2019/0051101 A1 | 2/2019 | Russ et al. |
| 2019/0051103 A1 | 2/2019 | Russ et al. |
| 2019/0088082 A1 | 3/2019 | Shigeta |
| 2019/0088086 A1 | 3/2019 | Rajendran |
| 2019/0102987 A1 | 4/2019 | Shigeta |
| 2019/0114871 A1 | 4/2019 | Garrison |
| 2019/0122483 A1 | 4/2019 | Lyons et al. |
| 2019/0147689 A1 | 5/2019 | Shigeta |
| 2019/0172312 A1 | 6/2019 | Shigeta |
| 2019/0188957 A1 | 6/2019 | Bulzacki et al. |
| 2019/0188958 A1 | 6/2019 | Shigeta |
| 2019/0236891 A1 | 8/2019 | Shigeta |
| 2019/0259238 A1 | 8/2019 | Shigeta |
| 2019/0266832 A1 | 8/2019 | Shigeta |
| 2019/0318576 A1 | 10/2019 | Shigeta |
| 2019/0320768 A1 | 10/2019 | Shigeta |
| 2019/0333322 A1 | 10/2019 | Shigeta |
| 2019/0333323 A1 | 10/2019 | Shigeta |
| 2019/0333326 A1 | 10/2019 | Shigeta |
| 2019/0340873 A1 | 11/2019 | Shigeta |
| 2019/0344157 A1 | 11/2019 | Shigeta |
| 2019/0347893 A1 | 11/2019 | Shigeta |
| 2019/0347894 A1 | 11/2019 | Shigeta |
| 2019/0362594 A1 | 11/2019 | Shigeta |
| 2019/0371112 A1 | 12/2019 | Shigeta |
| 2020/0034629 A1 | 1/2020 | Vo et al. |
| 2020/0035060 A1 | 1/2020 | Shigeta |
| 2020/0118390 A1 | 4/2020 | Shigeta |
| 2020/0122018 A1 | 4/2020 | Shigeta |
| 2020/0175806 A1 | 6/2020 | Shigeta |
| 2020/0202134 A1 | 6/2020 | Bulzacki et al. |
| 2020/0226878 A1 | 7/2020 | Shigeta |
| 2020/0234464 A1 | 7/2020 | Shigeta |
| 2020/0242888 A1 | 7/2020 | Shigeta |
| 2020/0258351 A1 | 8/2020 | Shigeta |
| 2020/0265672 A1 | 8/2020 | Shigeta |
| 2020/0273289 A1 | 8/2020 | Shigeta |
| 2020/0294346 A1 | 9/2020 | Shigeta |
| 2020/0302168 A1 | 9/2020 | Vo et al. |
| 2020/0342281 A1 | 10/2020 | Shigeta |
| 2020/0349806 A1 | 11/2020 | Shigeta |
| 2020/0349807 A1 | 11/2020 | Shigeta |
| 2020/0349808 A1 | 11/2020 | Shigeta |
| 2020/0349809 A1 | 11/2020 | Shigeta |
| 2020/0349810 A1 | 11/2020 | Shigeta |
| 2020/0349811 A1 | 11/2020 | Shigeta |
| 2020/0364979 A1 | 11/2020 | Shigeta |
| 2020/0364986 A1* | 11/2020 | Amaitis ................ G06Q 50/34 |
| 2020/0372746 A1 | 11/2020 | Shigeta |
| 2020/0372752 A1 | 11/2020 | Shigeta |
| 2021/0280008 A1* | 9/2021 | Soukup ............... G07F 17/3241 |
| 2021/0319657 A1* | 10/2021 | Gong ................. G07F 17/3239 |

FOREIGN PATENT DOCUMENTS

| | | |
|---|---|---|
| CN | 105900130 A | 8/2016 |
| CN | 107362524 A | 11/2017 |
| CN | 107362527 A | 11/2017 |
| CN | 108629920 A | 10/2018 |
| CN | 109069925 A | 12/2018 |

OTHER PUBLICATIONS

Kelly et al., "System and method for synthetic image training of A neural network associated with a casino table game Monitoring system", filed Jun. 21, 2019, U.S. Appl. No. 62/864,634, 36 pages.

Lyons et al., "System and method for collecting and using filtered Facial biometric data", filed Sep. 21, 2018, U.S. Appl. No. 62/734,661, 35 pages.

Chinese Office Action and Search Report from Chinese Application No. 202010200557.5, dated Dec. 3, 2021, 38 pages.

* cited by examiner

SYSTEMS AND DEVICES FOR IDENTIFICATION OF A FEATURE ASSOCIATED WITH A USER IN A GAMING ESTABLISHMENT AND RELATED METHODS

PRIORITY CLAIM

This application claims the benefit of the filing date of Indian Provisional Patent Application Serial No. 201941040664, filed Oct. 9, 2019, for "SYSTEMS AND DEVICES FOR IDENTIFICATION OF A FEATURE ASSOCIATED WITH A USER IN A GAMING ESTABLISHMENT AND RELATED METHODS," the disclosure of which is incorporated herein in its entirety by this reference.

TECHNICAL FIELD

The present disclosure relates generally to devices, systems, and related methods for identification of features related to a user or player interacting with such devices and systems. More particularly, the present disclosure relates to devices, systems, and related methods that employ one or more biometric identification techniques including, for example, facial recognition or object recognition for use in wagering game devices and systems, such as lottery, casino, and other wagering systems.

BACKGROUND

In gaming establishments, various methods have been implemented to monitor and/or identify patrons of the gaming establishment. For example, gaming devices and systems have incorporated biometric technology. For example, biometric technology has been incorporated into gaming devices to aid in the electronic transfer of funds. Additionally, gaming systems use biometric technology, such as an anonymous facial recognition system, in connection with player bonusing. For example, U.S. Pat. No. 8,972,299, issued Mar. 3, 2015, to Bally Gaming, Inc., the disclosure of which is incorporated herein in its entirety by this reference, discloses systems, gaming devices, and methods for biometrically identifying a player, where the capture of the biometric information is undisclosed to the player. As disclosed in U.S. Pat. No. 8,972,299, the captured biometric information may be used to verify a player's age, prevent underage gambling, promote responsible gaming, and authorize and/or authenticate an electronic funds transfer.

However, current casino and lottery gaming systems lack the ability to employ biometric identification over a range of platforms to enhance the experience of the patron and/or to increase the revenue of the gaming establishment.

Further, with the implementation of cameras capturing one or more features of the patrons participating in the game, such data may be utilized to further enhance the experience of the patron at the gaming establishment.

BRIEF SUMMARY

Some embodiments of the present disclosure include a method of monitoring a patron in a gaming establishment. The method may include, at a first gaming location in the gaming establishment, detecting, with a detection device, at least one physical feature associated with the patron of the gaming establishment; receiving, at a processor, the at least one detected physical feature; analyzing, with the processor, at least a portion of the at least one detected physical feature; associating, with the processor, data from the first gaming location with an account associated with the patron; at a second non-gaming location in the gaming establishment, detecting, with another detection device, the at least one physical feature associated with the patron of the gaming establishment; receiving, at the processor, the at least one detected physical feature; analyzing, with the processor, the at least a portion of the at least one detected physical feature; and adding additional data from the second non-gaming location to the account associated with the patron.

Some embodiments of the present disclosure include a system for monitoring a patron in a gaming establishment. The system including a biometric identification device; a remote processor; and a gaming device. The system is configured to at the gaming device in the gaming establishment, detect, with the biometric identification device, facial features associated with the patron at the gaming establishment; receive, at the remote processor, the facial features and data relating to actions of the patron at the gaming device; analyze, with the remote processor, at least a portion of the facial features; determine whether an account associated with the patron exists based on the analyzing of the facial features; and associate the data relating to actions of the patron at the gaming device with the account associated with the patron.

Some embodiments of the present disclosure include a method of administering a game. The method includes displaying, with a display device (e.g., projecting, with a projection device), a feature of the game at a display location on a gaming surface of a gaming device upon which the game is implemented; tracking, with one or more identification devices, movement or motion of one or more players participating in the game at the gaming surface of the gaming device; and in response to the movement or motion of the one or more players proximate the display location, altering the feature of the game with the display device.

Some embodiments of the present disclosure include a system for administering a wagering game. The system includes a gaming device having a gaming surface for performing the wagering game thereon, a display device (e.g., projection device) positioned proximate the gaming surface and configured to display one or more images on the gaming surface, and one or more identification devices. The system is configured to: detect, with the one or more identification devices, a feature associated with a player participating in the wagering game at the gaming surface; and, in response to detection the feature associated with the player participating in the wagering game, project, with the display device, a feature of the wagering game at a display location on the gaming surface.

BRIEF DESCRIPTION OF THE DRAWINGS

The present disclosure may be understood more fully by reference to the following detailed description of example embodiments, which are illustrated in the appended figures.

DETAILED DESCRIPTION

The illustrations presented herein are not meant to be actual views of any system, device, assembly, or component thereof, but are merely idealized representations employed to describe illustrative embodiments. The drawings are not necessarily to scale. Elements common between figures may retain the same numerical designation.

As used herein, the term "and/or" means and includes any and all combinations of one or more of the associated listed items.

As used herein, the terms "substantially," "approximately," or "about" in reference to a given parameter means and includes to a degree that one skilled in the art would understand that the given parameter, property, or condition is met with a degree of variance, such as within acceptable manufacturing tolerances, or wherein the variance is with respect to a general parameter, such as an orientation. For example, a parameter that is substantially met may be at least about 90% met, at least about 95% met, at least about 99% met, or even 100% met.

Embodiments of the present disclosure include systems, devices, and methods that may be utilized identify one or more features of a user (e.g., a player, a patron, a customer, a consumer, etc.) in an environment, for example, a gaming establishment or gaming environment (e.g., a casino, a provider of lottery games or other wagering or betting games, a race track, etc.). For example, an identity of the user may be obtained without requiring any affirmative action by the user as the user moves around and interacts with the gaming establishment. Such identification may be implemented through identifying one or more features of the user via biometric identification (e.g., facial recognition, fingerprints, hand and/or palm geometry, earlobe geometry, retina and iris patterns, voice waves, DNA, signatures, etc.).

Figure 1:
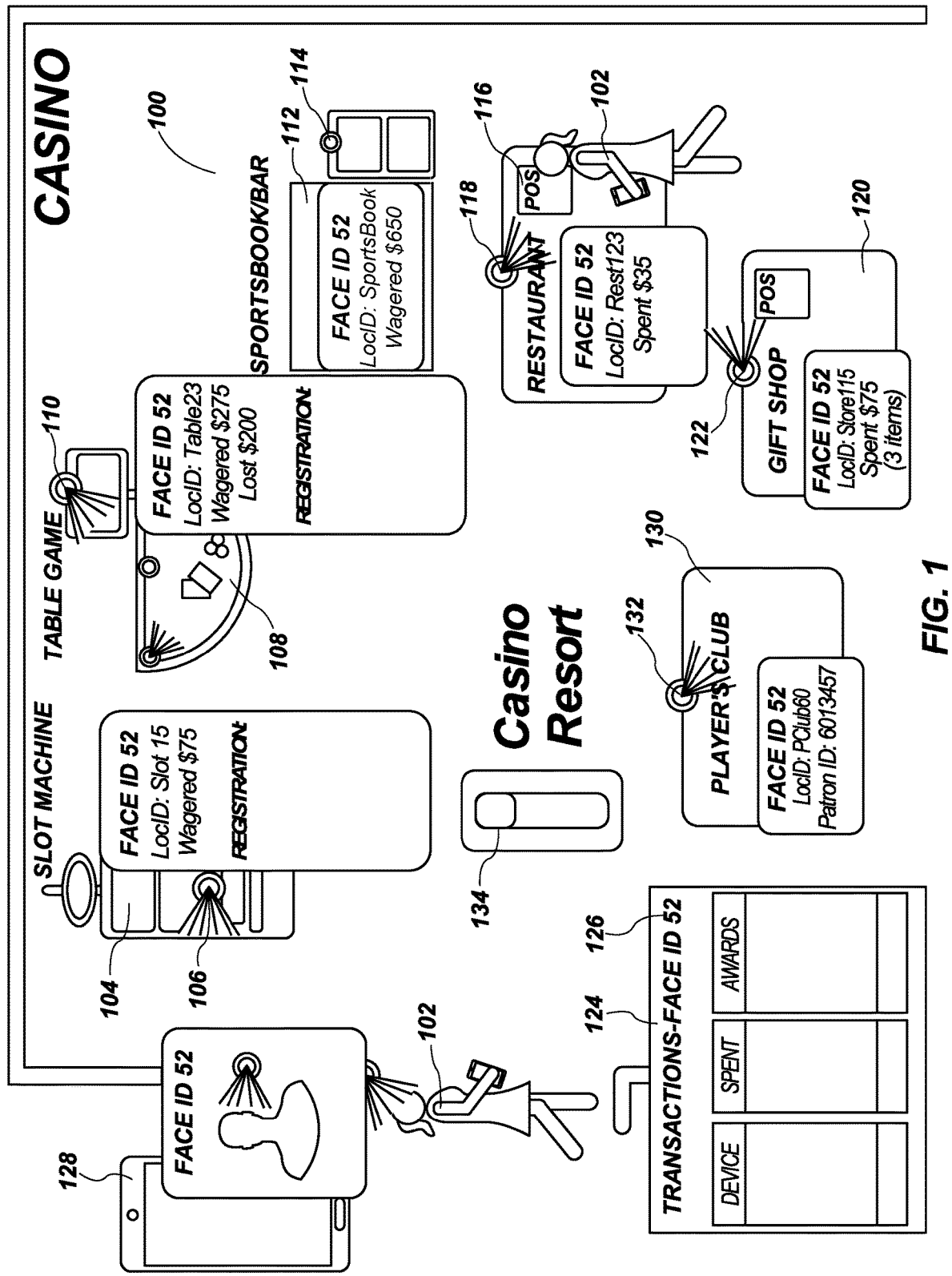
FIG. 1 illustrates a schematic view of a system that may be implemented at a gaming establishment in order to monitor the activity of a user in accordance with an embodiment of the disclosure.

For example, FIG. 1 illustrates a gaming establishment system 100 that may be implemented at a gaming establishment (e.g., a casino) in order to monitor the activity of a user (e.g., patron 102, player). As shown in FIG. 1, the gaming establishment system 100 may identify, track, and/or monitor the patron 102 (e.g., via identification devices or systems including one or more input devices, such as one or more optical devices, for example, video cameras) as the patron 102 moves around and/or interacts with portions of the gaming establishment. As depicted, the patron 102 may interact with (e.g., play a wagering game on) one or more gaming devices (e.g., slot machine 104, table game 108, sports book 112). Each of the slot machine 104, the table game 108 and the sports book 112 may include a biometric identification device to identify the patron 102 (e.g., camera device 106, camera device 110, camera device 114, respectively). Activity of the patron 102 (e.g., wagering, buy-ins, cash-outs, any indication of interest in certain types of wagering, games, bonus games, jackpot prizes, etc.) at one or more of the slot machine 104, the table game 108, and the sports book 112 may be logged and attributed to the identification number 126 of the patron 102 based on the portions of one or more of the slot machine 104, the table game 108, and the sports book 112 with which the patron 102 interacts and/or observes.

As discussed below in greater detail, it will be appreciated that the camera devices discussed herein may, in some embodiments, be part of an overall local and/or remote device or system with associated networks and the necessary hardware (e.g., processor, storage, etc.) necessary for capturing and obtaining information from the image capturing devices of the devices 106, 110.

In some embodiments, the biometric identification devices discussed herein (e.g., the camera devices) may be similar to that disclosed in U.S. Provisional Patent Application Ser. No. 62/734,661, filed Sep. 21, 2018, the disclosure of which is incorporated herein in its entirety by this reference, and/or U.S. Pat. No. 8,972,299, discussed and incorporated above.

For example, the camera devices may provide a live video stream to a biometric identification device (e.g., a local and/or remote facial recognition unit). The live video stream is processed by the facial recognition unit to generate facial biometric data. The facial recognition software solution may provide a software developers kit (SDK) with basic functionality that allows the facial recognition unit to input faces from the view provided by the cameras into the facial recognition software solution and receive corresponding biometrics in return. For example, the system may determine how many faces are found in a view, the approximate age of the faces found, and the genders of the faces found, for demographic identification and/or gambling age verification, as will be discussed below.

As discussed below in greater detail, the identification devices, along with any related devices, may be in communication with an external system, which may include, in various aspects, one or more networks, other vending machines or terminals, various gaming servers, a patron loyalty database, a remote controller, communications hardware, or a variety of other interfaced systems or components, in any combination. The biometric identification device and its associated local device may operate as a thin, thick, or intermediate client and may include additional peripheral devices, hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In an embodiment, the patron 102 may approach the slot machine 104 and begin a wagering game. Without any intervention by the patron 102 or an operator or attendant of the gaming establishment, the camera device 106 may be utilized to identify the patron 102 and assign the patron 102 an identification characteristic (e.g., identification number 126, discussed below) to the patron 102. As discussed below, the identification of the patron 102 may be compared to known identities of patrons 102 in a local and/or remote database to determine whether the patron 102 has been previously identified (e.g., may already have a corresponding identification number 126) or is a new patron 102 (e.g., may lack a corresponding identification number 126).

In another embodiment, the patron 102 may approach the table game 108 and begin a wagering game. Without any intervention by the patron 102 or an operator or attendant of the gaming establishment, the camera device 110 may be utilized to identify the patron 102 and assign the patron 102 an identification characteristic (e.g., identification number 126, discussed below) to the patron 102. As discussed below, the identification of the patron 102 may be compared to known identities of patrons 102 in a local and/or remote database to determine whether the patron 102 has been previously identified (e.g., may already have a corresponding identification number 126) or is a new patron 102 (e.g., may lack a corresponding identification number 126).

In some embodiments, the identification number 126 may be anonymous, where the actual data relating to the patron 102 may not be known or may not be associated with the identification number 126. As discussed below, the identification number 126 or associated account, may initially be anonymous (e.g., where the patron 102 may not even be aware of the information being collected). However, personal information be added to the anonymous account (e.g., by the patron 102) in order to convert the anonymous account to a known account.

In additional embodiments, the identification number 126 may be (e.g., initially or after being updated as discussed herein) associated with actual data relating to the patron 102 (e.g., name, age, address, gender, race, demographic information, history, preferences, etc. of the patron 102) where the identity of the patron 102 matches an identity known by gaming establishment system 100 and may be associated with the identification number 126 (e.g., which may be an existing identification number 126).

In some embodiments, the biometric identification device may identify the patron 102 with or without a player card or other personal identification (e.g., personal identification number 126 or challenge-response authentication).

The patron 102 may travel about the gaming establishment and be further identified by the gaming establishment system 100 at additional locations of the establishment. For example, the patron 102 may enter another gaming area (e.g., sports book 112) and may be identified by camera device 114, which may be located at one or more selected areas of the sports book 112 (e.g., at a cashier, at wager placing station operated by a computer or by a gaming attendant, etc.). Activity of the patron 102 (e.g., wagering, any indication of interest in certain types of wagering, teams, players, types of sports, etc.) in the sports book 112 may be logged and attributed to the identification number 126 of the patron 102 based on the portions of the sports book 112 with which the patron 102 interacts and/or observes.

As depicted in FIG. 1, the gaming establishment system 100 may identify the patron 102 as the patron 102 travels to and/or interacts with other portions of the gaming establishment (e.g., non-gaming or non-wagering activities where, for example, purchases and not wagers are accepted in exchange for goods and/or services). For example, the patron 102 may visit a restaurant 116 and/or gift shop 120 associated with (e.g., at) the gaming establishment. Camera device 118 (e.g., at a host/hostess station) and/or camera device 122 (e.g., at a cashier station, outside a fitting room, at certain sales areas within the gift shop 120) may respectively identify the patron 102. Activity of the patron 102 in the restaurant 116 and/or gift shop 120 (e.g., purchases, preferences, etc.) may be logged and attributed to the identification number 126 of the patron 102 based on the portions of the restaurant 116 and/or gift shop 120 with which the patron 102 interacts and/or observes.

In some embodiments, additional camera devices (e.g., camera devices 106, 110, 114, 118, 122, or one or more general camera devices 134, which are configured for detection rather than basic internet protocol (IP) cameras), which are unassociated with any particular game or certain locale in the gaming establishment, may be placed throughout the gaming establishment at a variety of locations and not necessarily tied to a particular gaming or retail area (e.g., configured as security camera). Such additional camera devices 134 may be utilized to identify activity of the patron 102, or other individuals, as the patron 102 moves about the gaming establishment between selected gaming and non-gaming areas. In some embodiments, such additional camera devices 134 (e.g., or one or more of the other camera devices discussed herein) may comprise or be part of an artificial intelligence (AI) system (e.g., which may be configured for machine learning) that assist in tracking the journey of the patron 102 as the patron 102 moves around the gaming establishment (e.g., a gaming resort, a retail lottery store). For example, such camera devices 134 may be configured to detect the patron 102 (e.g., via facial recognition and analysis), detect activity of the patron 102 or others around the patron 102 (e.g., a path of travel of the patron 102), and/or detect the surrounding environment or scene. Such a configuration may be utilized to monitor the patron's 102 general activity in the establishment to further gather data related to the patron 102 to enhance the patron's 102 current or future visits to the gaming establishment.

While certain wagering and non-wagering activities are mentioned above, it will be appreciated that the gaming establishment system 100 may identify the patron 102, along with any related activity, at any other locations such as, for example, at any other type of wagering activities, such as card games areas, bingo areas, lottery games (e.g., draw lottery, instant lottery, jackpot lottery, pull tabs, keno, etc.), video or computer gaming areas, shows, local or remote activities, shopping malls, bars, golf courses, vending machines, ATMs, transportation centers, parking garages, elevators, entrances and exits, pools, spas, etc.

Each of the various locations of the gaming establishment (e.g., the slot machine 104, the table game 108, the sports book 112, the restaurant 116, the gift shop 120) may be in communication with one or more central devices, systems, and/or networks of the gaming establishment system 100 (e.g., computer 124) such that at each location the gaming establishment system 100 may communicate with the computer 124. For example, the camera devices 106, 110, 114, 118, 122 may be in communication with another portion of gaming establishment system 100 to pass data (e.g., facial images) from the camera devices 106, 110, 114, 118, 122 to a local or remote device or server (e.g., computer 124, cloud, network, another server, etc., as discussed below).

As depicted, the identification number 126 (e.g., an account) may be assigned to the patron 102 based on biometric information obtained from the patron 102 (e.g., from a particular facial scan). The biometric information may be associated with each of the locations of the gaming establishment system 100 (e.g., an associated device at each location, such as the camera devices 106, 110, 114, 118, 122) that have detected the patron 102. For example, each time the gaming establishment system 100 detects a facial scan matching a previously stored facial scan (e.g., stored in a database on for example, computer 124) corresponding to the same patron 102 or an unrecognized facial scan indicating a new patron 102, activity of that patron 102 is then associated with a corresponding identification number 126. The computer 124 may record the interactions of the patron 102 at each of these locations (e.g., a dollar amount spent or received at each location, with an associated total amount, preferences indicated by the patron 102, other actions taken by the patron 102, etc.) and link those actions to the identification number 126 for further updating, analysis, and responsive action by the gaming establishment. For example, a patron 102 may wager a sufficient amount of money, as tracked by the gaming establishment system 100, to initiate "comps" (i.e., awards) in the form of free meals, shows, rooms, etc.

In some embodiments, where the patron 102 already has an associated account (e.g., including an existing identification number 126) with the gaming establishment system 100, the patron 102 may be able to access funds associated with the account in order to participate in wagering games and/or to make purchases with the account without the need for providing documentation of identity (e.g., by verifying the patron's 102 identity via biometric information).

In some embodiments, the information associated with the identification device(s) may be used in connection with issuing awards, bonuses, and/or services to identified patron 102, which may be automatically loaded into an account associated with the patron 102 and/or the identification number 126. For example, and as depicted, the computer 124 may identify and catalogue awards that are available to the patron 102 based on the information associated with the history of the patron 102 recorded by the gaming establishment system 100. Such rewards may be given to the patron 102 based on actions from a current visit, a previous visit, or both.

In some embodiments, the biometric information may be used to restrict the activities of identified problem gambler or banned players. The biometric information may be used to restrict illegal activities such as, but not limited to, money laundering, counterfeiting, or underage gambling. For example, the gaming establishment system 100 may make a determination of the age of the patron 102 based on the biometric information. If the gaming establishment system 100 cannot verify an age of the patron 102 based on the biometric information (e.g., within a select percentage of certainty), the gaming establishment system 100 may provide an alert that an age verification should be performed (e.g., by an attendant) before allowing the patron 102 to participate in any wagering games. In the case of an automated game, the device may pause operation until an override can be provided after the age of the patron102 is addressed. The biometric information may be used to authenticate or provide additional security measures for electronic funds transfer authorization, transaction auditing, or account based gaming.

In some embodiments, the biometric information may be used to provide player-centric gaming. For example, once the patron 102 is identified through the obtained biometric information, a game may be reconfigured according to the patron's 102 previously established preferences.

In some embodiments, the patron's 102 game state or game data may be associated with the biometric information. The game state or game data may be saved and later retrieved by the patron 102 based on the same biometric information received on a gaming device having a biometric input device.

In some embodiments, the gaming establishment system 100 may be accessed by and/or may push information to a mobile device 128 (e.g., where the player has provided such information). For example, the computer 124 may notify the patron 102 of awards that the patron 102 has received via the mobile device 128. In some embodiments, the computer 124 may send notifications to the patron 102 regarding incentives for participating in games, activities, and/or events provided by the gaming establishment. For example, where the patron 102 is not recognized by the gaming establishment system 100, the computer 124 may provide a notification and/or incentive (e.g., a nominal wagering credit) for the patron 102 to provide additional information to create a known account in the gaming establishment system 100.

In some embodiments, the patron 102 may utilize the mobile device 128 to connect to and check the status of aspects of the patron's 102 account.

A player's club 130 (e.g., with associated camera device 132 for identifying the patron 102) may be associated with the gaming establishment system 100 where in person and/or automated attendants may assist the patron 102 in setting up and/or maintaining an associated account. For example, an anonymous account may be converted into a known account by providing additional information (e.g., name, address, phone number, email address, biographical information, demographic information, etc.). As noted above, in order to incentivize the patron 102 to set up such an account, the gaming establishment system 100 may offer the patron 102 one or more incentives, awards, and/or promotions (e.g., via the mobile device 128 and/or on displays associated with devices of the gaming establishment system 100) for creating such an account.

Figure 2:
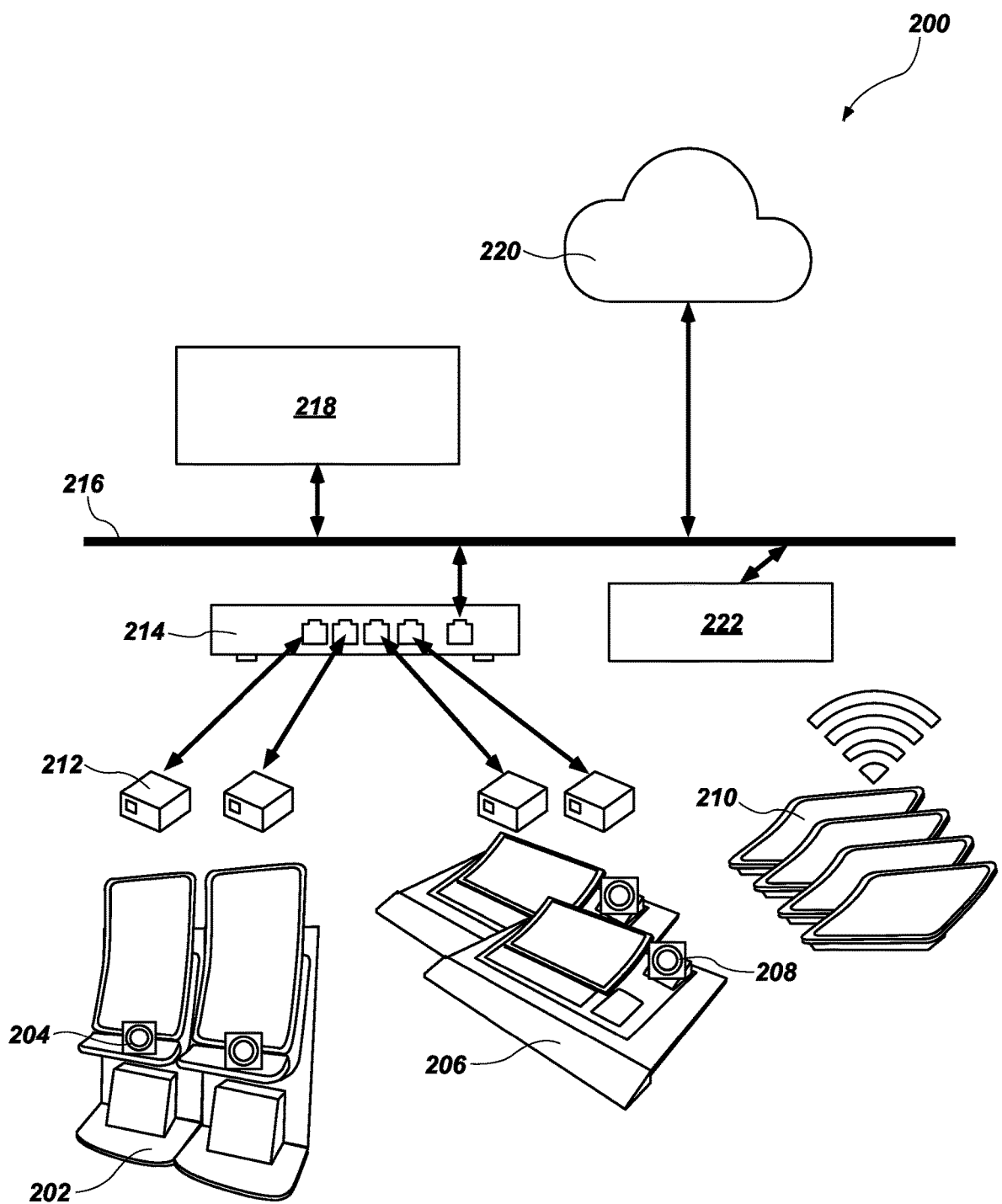
FIG. 2 illustrates a schematic view of a network system in accordance with an embodiment of the disclosure.

FIG. 2 illustrates an example of a network system 200 (e.g., which may be part of, or for use with, the gaming establishment system 100 of FIG. 1) for handling the data associated with the identification of the patron 102 (FIG. 1). As shown in FIG. 2, one or more devices (e.g., gaming devices, non-gaming devices, etc.) may include one or more associated devices for obtaining information relating to the patron 102 (e.g., biometric information). For example, one or more slot machines 202 with one or more associated camera devices 204, one or more bartop gaming devices 206 with one or more associated camera devices 208, and/or one or more tablet gaming devices 210 (e.g., with integrated camera devices) may be in communication (e.g., connected to) the gaming establishment network 216. Other gaming devices or non-gaming devices, such as those discussed above, may also be implemented on the network system 200, along with additional identification devices (e.g., camera devices) that are associated with or unassociated with gaming devices or non-gaming devices.

In some embodiments, one or more of the devices 202, 206, 210 may be configured for lottery-type gaming, for example, where the gaming establishment may be a retail store that provides lottery gaming, such as a gas station, convenience store, grocery store, or another type of lottery establishment. For example, the one or more of the devices 202, 206, 210 may comprises an automated lottery machine that provides lottery tickets directly to a user without the need for an attendant.

Regardless of the wagering game or other service being implemented, the devices 202, 206, 210 may be configured to provide an age-verification service utilizing the biometric information obtained by the associated identification devices (e.g., camera devices 204, 208) where a user may only access the devices 202, 206, 210 after the user's age has been verified (e.g., generally without the need for human intervention in the verification process, as discussed above).

As depicted, the devices 202, 206, 210 may be connected to the gaming establishment network 216 via wireless and/or wireless connections. The devices 202, 206, 210 may include a computer or processing component (e.g., one or single board computers 212, with associated processors and memory), which may be part of, or separate from, the camera devices 204, 208 that assist in acquiring (e.g., processing, sorting, transmitting, etc.) images from the camera devices 204, 208. The single board computers 212 may be coupled to a switch 214 (e.g., a power over Ethernet (PoE) switch) that connects to the gaming establishment network 216 (e.g., which may be a local network 200 at the gaming establishment).

The gaming establishment network 216 may be connected to local or remote device in order pass data (e.g., biometric information, such as, facial recognition data, object recognition data, etc.) for analysis and/or storage. For example, the network 200 may be connected to a local server at the gaming establishment (e.g., gaming establishment server 218). The gaming establishment server 218 may comprise a central control system of the devices 202, 206, 210 and/or may store information related to the players (e.g., a players club database). In some embodiments, the gaming establishment server 218 may include local backup storage for a remote server or cloud, software-defined storage (SDS), and/or a certificate management protocol (CMP) server.

As depicted, the gaming establishment network 216 may be connected to one or more local or remote servers (e.g., cloud servers 220) that may further process the data collected at the devices 202, 206, 210. For example, facial or object recognition data may be passed to the cloud servers 220 in order to find a match for the facial or object recognition data. In some embodiments, recognition software (e.g., programmed via machine learning) may be utilized to analyze the facial or object recognition data and to determine if a match exists in a database on the cloud servers 220. Such machine learning may be accomplished by training a computer (e.g., cloud servers 220) to recognize objects, recognize human features, and/or to otherwise handle or process inputted data by inputting examples into the computer (e.g., real or virtual representations). In some embodiments, such machine learning for use in a gaming establishment may be similar to that disclosed in U.S. Provisional Patent Application Ser. No. 62/864,634, filed Jun. 21, 2019, the disclosure of which is incorporated herein in its entirety by this reference.

In the case of a player's identity, if a match is found, the cloud servers 220 may match the known identity (e.g., anonymous or with associated personal information) of the player (e.g., the identification number 126 (FIG. 1)) such that data received from the devices 202, 206, 210 can be matched to the identification of the player and stored locally and/or remotely (e.g., on the gaming establishment server 218, on the cloud servers 220). As above, if no match it found, a new identification number 126 (FIG. 1) may be assigned to track the activity of the player.

In some embodiments, when an identity of the patron 102 (e.g., anonymous or known) in the gaming establishment is assigned, that identity may be stored locally (e.g., at computer 212, server 218) for a period of time (e.g., for an expected period of time that the patron 102 may remain in the gaming establishment, until the patron's 102 leaves the view of a camera, etc.).

The data stored relating to the players may be utilized to analyze the players' behavior, for example, resulting in the ability for the gaming establishment to customize incentive offered to the player in order to enhance the relationship between the gaming establishment and the player (e.g., to entice the player to spend more money, resources, and/or time at the gaming establishment). For example, the data may be utilized to determine the amount spent and/or wagered by the player, the amount won, items purchased, days and time of day when the player visits, favorite or most played games, types of wagering, food and good preferences, etc.

As above, in some embodiments, additional camera devices 222 (e.g., which may also be configured as security cameras and/or may be part of an AI system as discussed above) may be placed throughout the gaming establishment (e.g., around the locale of the devices 202, 206, 210) in order to identify selected activity of individuals in the gaming establishment (e.g., whether they are engaging with the devices 202, 206, 210 or not).

Figure 3:
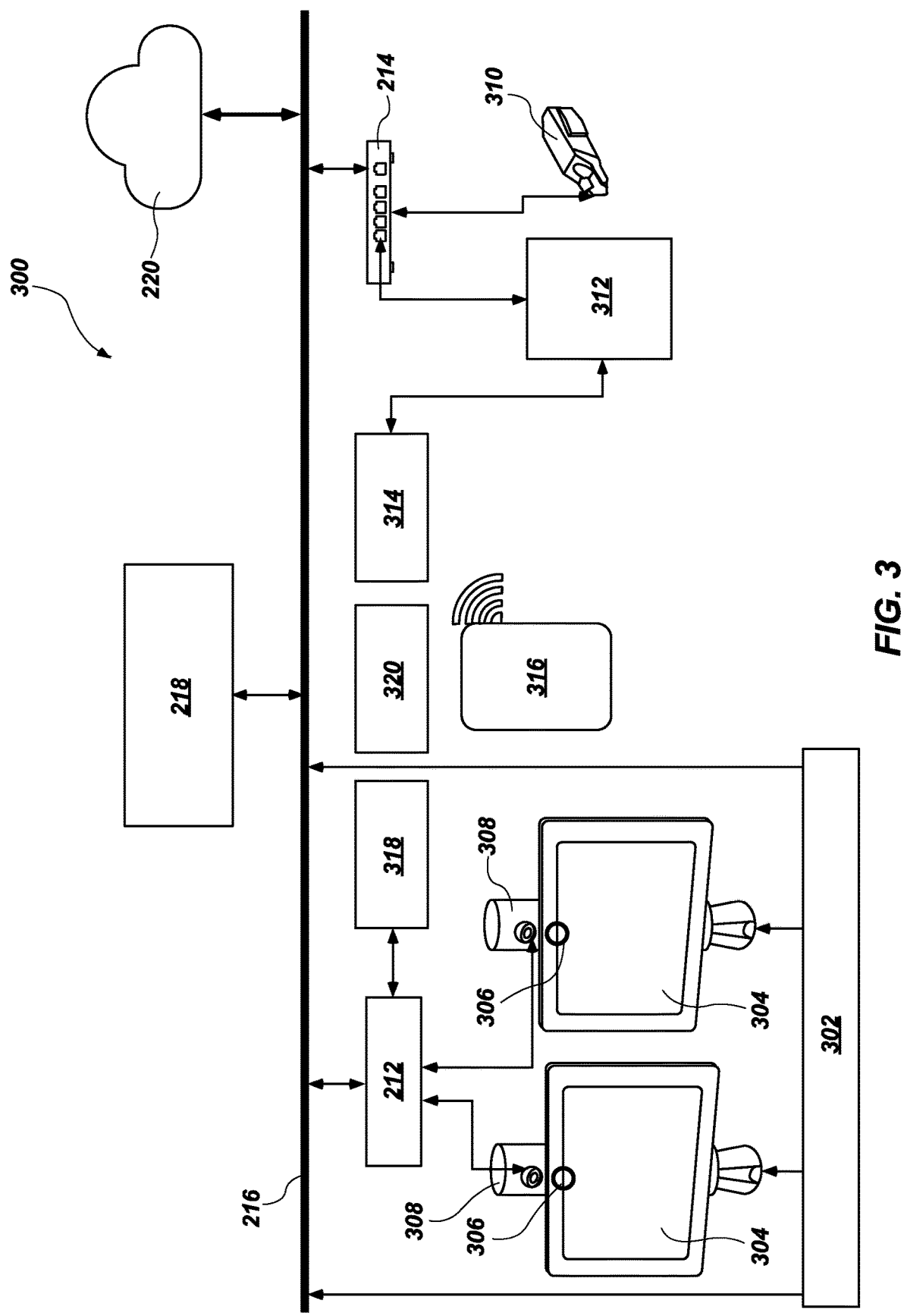
FIG. 3 illustrates a schematic view of a system that may be implemented at a gaming establishment in order to monitor the activity of a user or other related items in accordance with an embodiment of the disclosure.

While the above embodiments generally disclose the use of identification devices for recognizing biometric information from a patron or player, other embodiments may implement the use of such devices for identifying other features associated with the player or patron, alternative from, or in addition to, the identification of biometric information. For example, FIG. 3 illustrates a gaming establishment system 300 that may be implemented at a gaming establishment in order to monitor the activity of a user (e.g., player) or other related items. As shown in FIG. 3, a support surface (e.g., gaming table 302) may support one or more displays (e.g., one or more table screens 304) positioned on opposing sides of the table 302. Table screens 304 may be utilized to provide information relating to the game (e.g., table limits, bonus or jackpot information, etc.), advertisements, promotions, and/or feeds of other games or events to the players at the table 302.

Identification devices (e.g., player camera devices 306) may be positioned about the table 302 (e.g., on a stand with the table screens 304). The player camera devices 306 may be utilized to identify biometric information from the players at the table 302, for example, in a similar manner to that discussed above.

One or more additional identification devices may be utilized to identify portions of the players and/or objects associated with the players. For example, table camera devices 308 (e.g., positioned on a stand with the table screens 304) and may be utilized to detect the hands and/or arms of the players and/or objects associated with the players (e.g., cards, chips, currency, and/or other objects on the table 302). In some embodiments, the table camera devices 308 may be utilized to detect an amount of a wager or other currency (e.g., a buy-in) placed by a player on the table 302. In some embodiments, the table camera devices 308 may identify (e.g., and track) movement of the player at the table (e.g., when the player approaches and leaves the table 302, movement of the player's arms and/or hands about the table 302, as the player interacts with objects on the table 302, personal items of the player near or on the table 302).

While the player camera devices 306 for identifying biometric information and the table camera devices 308 have been discussed above as separate elements, in other embodiments, such elements may be combined in a single device.

As above, data from the camera devices 306, 308 may be communicated to the gaming establishment network 216 and to the gaming establishment server 218 and/or cloud servers 220 (e.g., optionally through the single board computers 212). For example, the biometric information from the player camera devices 306 may be supplied for identification of the players in a manner similar to that discussed above.

Data from the table camera devices 308 may be supplied to the gaming establishment server 218 and/or cloud servers 220 to identify the objects captured by the table camera devices 308. For example, recognition software (e.g., programmed via machine learning) may be utilized to identify the objects (e.g., match in a database, recognize through machine learning, etc.) at the gaming establishment server 218 and/or cloud servers 220. In embodiments where an amount of wagers (e.g., one wagering chip or a stack of wagering chips, of identical or mixed values) is identified, the amount of wagering of each player may be identified and tracked for use by the gaming establishment as discussed above. Further, the efficiency and security of the table 302 may be increased by identifying the wagers, in order to verify wagered amount, especially in the case of a bonus or jackpot payout. As noted above, other objects may be identified and tracked, such as, for example, motions of the players (e.g., the player's arms and/or hands as the player interacts with the table 302 and items thereon), objects associated with the players (e.g., currency, drinks, mobile devices, etc.). For example, the gaming establishment may monitor the status of the player's drink and alert an attendant if a refill is needed. In some embodiments, the gaming establishment may monitor the posture and/or body language of the players and take action as necessary (e.g., by intervening with a bonus or promotion in order to incentives the player). In some embodiments, the gaming establishment may utilize the information for security purposes by monitoring if the player indicates signs of cheating, inebriation, and/or undesirable emotional states and may monitor interaction of the players with items on the table (e.g., to monitor for misuse or misallocation of game elements, such as, cards, chips, dice, balls, etc. or wagering implementations).

As depicted, the table screens 304 may be connected to the gaming establishment network 216, the gaming establishment server 218, and/or cloud servers 220 in order to control the content displayed on the table screens 304 at the table 302.

The gaming establishment system 300 may include additional gaming implements for performing the game (e.g., card handling device 310, such as a card shuffler, sorter, and/or shoe, chippers, roulette wheels, etc.). For example, the card handling device 310, which may include a card recognition device for detecting the value and/or rank of the playing cards, may be coupled to the gaming establishment network 216 (e.g., via Ethernet switch 214). A device computer 312 and/or external display 314 may be coupled to the card handling device 310 and/or the gaming establishment network 216. In some embodiments, the device computer 312 may track data from the shuffler and display that data to the dealer and/or other attendants of the gaming establishment (e.g., via display 314). Data relating to the cards present in and/or dealt from the card handling device 310 may be identified and tracked by providing that data from the card handling device 310 and/or device computer 312 to the gaming establishment server 218 and/or cloud servers 220. Such data (e.g., along with other data relating to the positions of players at the table 302) may be utilized to assign cards or an associated hand to each player enabling the gaming establishment system 300 to further track and verify the cards attributed to each player during each game (e.g., to verify hand composition in the event of a bonus or jackpot event and/or to track the gaming trends or habits of each player).

In some embodiments, the gaming establishment system 300 may include one or more mobile devices (e.g., tablet 316) to enable a local or remote user to monitor and/or participate in the wagering games being performed at the table 302.

In some embodiments, the gaming establishment system 300 may include one or more external displays (e.g., screen 318, screen 320) that may enable a local or remote user to monitor the wagering games being performed at the table 302.

Figure 4:
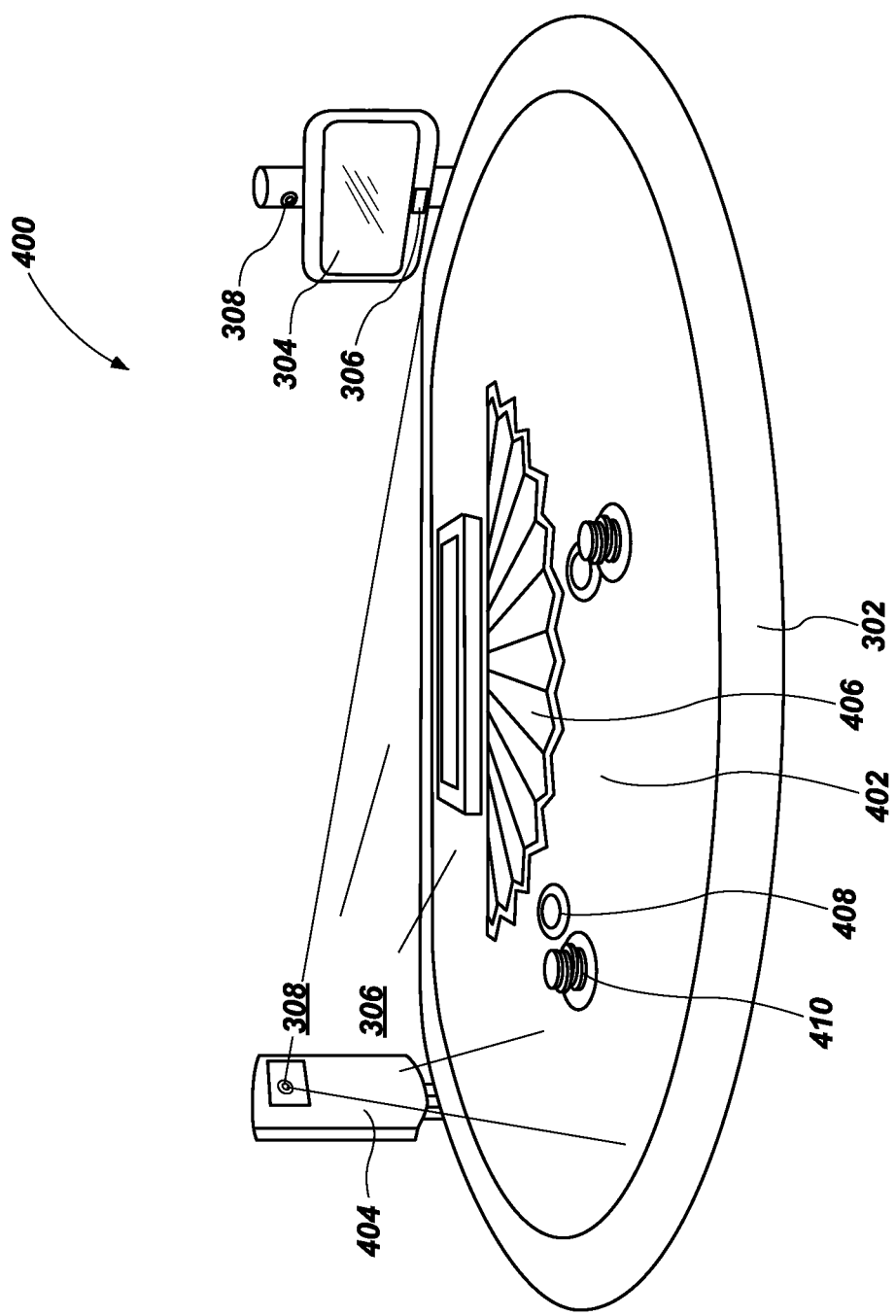
FIG. 4 illustrates a schematic view of a system that may be implemented at a gaming establishment in order to monitor the activity of a user or other related items in accordance with an embodiment of the disclosure.

FIG. 4 illustrates a gaming establishment system 400 that may be implemented at a gaming establishment in order to monitor the activity of a dealer or other game attendant, a user (e.g., player) or other related items. In some embodiments, the gaming establishment system 400 may include similar devices and elements to that discussed above. As shown in FIG. 4, a support surface (e.g., table 302 with table surface 402, an augmented table game) may include one or more table screens 304 (e.g., with associated camera devices 306, 308). The gaming establishment system 400 may include a display device (e.g., projection device 404, table screens 304, an external display over the table 302, a mobile device, etc.) configured to display one or more graphics (e.g., animation, videos, text, images, etc.) at the table 302 (e.g., on the table surface 402). For example, the projection device 404 may be positioned on one lateral side of the table 302 (e.g., opposite the table screen 304) and may project one or more features of a table game on the table surface 402. In some embodiments, where the table 302 includes a table screen 304 on one lateral side and the projection device 404 on the opposing side, camera devices 306, 308 may be positioned proximate or on the projection device 404. In some embodiments, the image displayed from the projection device 404 may be mapped to the table 302 in a setup configuration in order to ensure that the images are displayed in the desired location on the table 302.

As depicted, the projection device 404 may display a prize selection feature (e.g., a prize or spin wheel 406) and one or more wagering features (e.g., a bonus wager area 408, wager area 410). In some embodiments, the projection device 404 may define, supplement, and/or duplicate the boundaries of such areas on the gaming surface. In additional embodiments, other features of the table 302 may be displayed, such as, for example, game information areas, gaming implement areas (e.g., card areas, dice area, etc.), bonus areas, video or still image feeds (e.g., advertisements, videos of other gaming and/or sporting events), drink area, side games, etc. As discussed below, the projection device 404 may be aligned with selected sections of the table surface 402 (e.g., printed boundaries of the wager area 410, boundaries of other object areas, etc.) such that the images projected may interact (e.g., visually appear to interact) with the objects and/or areas (e.g., images displayed may appear to interact), with a wager placed in a wager area 410 in order to highlight the placing of such a wager.

In some embodiments, the projection device 404 may project images and/or video (i.e., a visual display element), along with associated sound effects (e.g., from a speaker of the projection device 404 and/or external speaker located proximate the table 302) upon the occurrence of selected events. For example, selected events at the table 302 (e.g., a selected wager, outcome, and/or bonus) may trigger a visual and/or audio event that is displayed on the table 302. As above, the projection device 404 may configured (e.g., aligned with certain elements of the table surface) to highlight such selected events by projecting the images in a manner that the images appear to interact with (e.g., positioned proximate, adjacent to, and/or projected over or on) the location of such objects associated with the selected event (e.g., chip stack, card, print on felt).

In an embodiment, prize wheel 406 may be displayed upon the occurrence of a selected outcome (e.g., a bonus event) where the prize wheel 406 may be spun (e.g., by the player as discussed below) in order to determine a prize outcome based on the prize wheel 406. In some embodiments, the gaming establishment system 400 may monitor motions of the players (e.g., movement of the player's hand and/or arm, gestures of the players, etc.) with the table camera devices 308 to enable the player to interact with (e.g., spin) the virtual prize wheel 406 that is displayed on the table 302. For example, the table camera devices 308 may track a player's hand such that the prize wheel 406 is engaged with the player's hand once the player's hand is positioned at the table 302 proximate the prize wheel 406. Once the player's hand or portion thereof (e.g., fingers) is within a threshold area or volume proximate the prize wheel 406, the prize wheel 406 may engage with the player's hand and move in unison with the player's hand. For example, substantially side to side movement of the player's hand detected by the table camera devices 308 will cause corresponding movement on the prize wheel 406 (e.g., corresponding forward and backward rotation). A threshold event of the player swiping their hand (e.g., movement at a selected velocity) as detected by the table camera devices 308 will result in the prize wheel 406 beginning a spinning event (e.g., where the player's movement no longer effects the prize wheel 406 as it spins, slows, and then lands on a selected segment corresponding to a selected award or prize).

In additional embodiments, the gaming establishment system 400 may be configured that selected motions by the player may further dictate movement of the prize wheel 406 (e.g., to slow or stop the prize wheel 406).

In some embodiments, the gaming establishment system 400 may be configured to detect a hovering position of the player's hand, where the prize wheel 406 is only engaged once the player lowers their hand to a threshold height about the table surface 402.

In additional embodiments, another feature, virtual (e.g., a projected button, dial, switch, etc.) or physical, may be utilized to interact with a projected element on the table 302, such as the prize wheel 406 (e.g., a virtual or physical button that is pressed in order to start the spinning of the prize wheel 406).

In some embodiments, the interaction of the players with the table 302 (e.g., placing of selected wagers and/or a selected outcome based on a selected wager, interaction with other gaming elements, such as cards, balls, dice, chips, etc., or combinations thereof) may trigger a display element by the projection device 404. For example, when a selected wager is placed (e.g., a bonus or jackpot wager at bonus wager area 408 and/or a wager at wager area 410), such an action as observed by the table camera devices 308 by monitoring a betting area may trigger an accompanying visual and/or audio event that is displayed on the table 302 in order to enhance the wagering game.

As above, the table camera devices 306, 308 may be utilized to monitor various areas of the table 302 and/or motions of the players, or movements of objects being manipulated by the players and/or dealer, in order to effect and/or enhance the observed triggering event by highlighting a win, a fold, a payout, a bonus, a side wager, etc.

While projection device 404 is shown as a short-throw front projector, other embodiments may include other types of front, side, and/or rear projection. Further, as noted above, additional embodiments may include other display devices instead of, or in addition to, the projection device 404.

Figure 5:
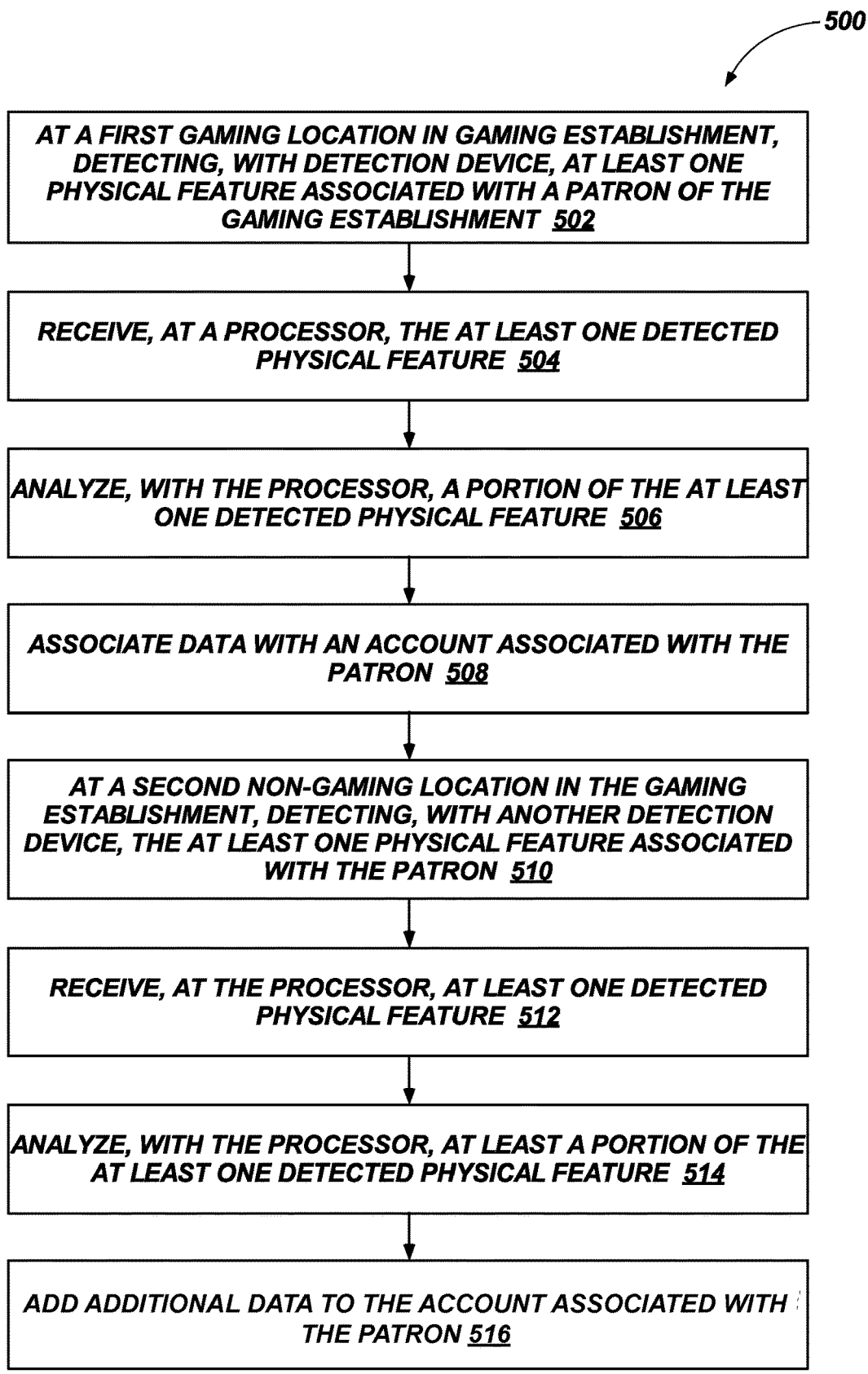
FIG. 5 illustrates an example of a method of monitoring a patron in a gaming establishment in accordance with an embodiment of the disclosure.

FIG. 5 illustrates an example of a method 500 of monitoring a patron in a gaming establishment that may performed by methods and/or systems (e.g., systems 100, 200, 300, 400 in FIGS. 1 through 4) discussed above (e.g., patron 102 of gaming establishment system 100 as discussed with reference to FIG. 1). For example, in block 502, at a first gaming location in the gaming establishment (e.g., a gaming device such as those discussed above, such as devices 202, 206, 210 (FIG. 2)) at least one physical feature (e.g., facial features, other biometric information) associated with the patron of the gaming establishment may be detected with one or more detection devices (e.g., the camera devices discussed above).

In block 504, a processor (e.g., computer 124, gaming establishment server 218, cloud servers 220) receives the at least one detected physical feature.

In block 506, the processor may analyze at least a portion of the at least one detected physical feature to identify a patron. As above, the identification of the patron may initially be anonymous (e.g., may be used or solely used for the purpose of distinguishing or differentiating one patron from other patrons) where the patron may not even be aware that their activity is being monitored. For example, while the patron may or may not have an identity known by the system, that identity may be limited to activity in the gaming establishment along with the detected features without any personal information related to the patron. As discussed above, one or more actions may be taken (e.g., by the patron) in order to associated personal identification with the identity in the system where the identification by the system would no longer be anonymous.

In block 508, the processor may associate data from the first gaming location with an account associated with the patron (e.g., by creating a new account if no previous match is found or by adding the data to a new account if a match is found).

In block 510, another detection device at a second non-gaming location in the gaming establishment may detect, with another detection device (e.g., a device similar to the first detection device above, but at a differing location in the gaming establishment) the at least one physical feature associated with the patron of the gaming establishment.

In block 512, the processor again receives the at least one detected physical feature.

In block 514, the processor again analyzes the at least a portion of the at least one detected physical feature to identify the patron.

In block 516, the processor adds and/or updates additional data from the second non-gaming location to the account associated with the patron.

As above, such data from multiple locations associated with the gaming establishment may be matched and stored in order to monitor the patron as they move about the gaming establishment between both gaming and non-gaming areas (e.g., shopping, restaurants, events, etc.) of the gaming establishment system. As above, while the patron may be initially anonymously identified in the system, the account may be later linked to personal information relating to the patron (e.g., if the patron provides such information, which may enable the patron to access the account and/or receive information relating to the account, for example, with a mobile device).

Figure 6:
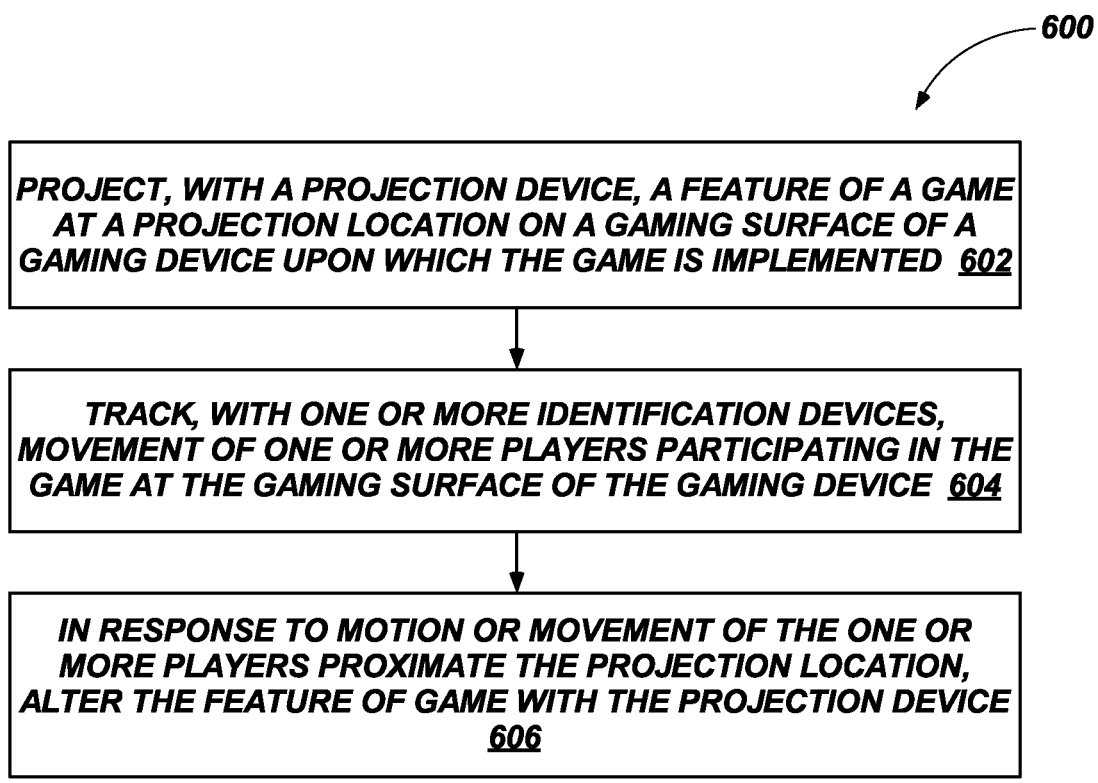
FIG. 6 illustrates an example of administering a wagering game in accordance with an embodiment of the disclosure.

FIG. 6 illustrates an example 600 of administering a wagering game that may be performed by methods and/or systems discussed above (e.g., systems 100, 200, 300, 400 in FIGS. 1 through 4). For example, in block 602, a projection device (e.g., projection device 404 (FIG. 4)) projects a feature of the game at a projection location on a gaming surface of a gaming device (e.g., gaming surface 402 of table 302 (FIG. 4)) upon which the game is implemented.

In block 604, one or more identification devices (e.g., the camera devices discussed above) may track motions of one or more players participating in the game at the gaming surface of the gaming device (e.g., hand movement, arm movement, motion, gestures, etc.).

In block 606, in response to the motions of the one or more players proximate the projection location, one or more portions of the system may alter the feature of the game with projection device. For example, movement of a player may be tracked such that the player may appear to spin a virtual feature (e.g., spin wheel) that is virtually projected on a surface of gaming device.

As above, such monitoring and/or tracking, along with the projection device, may be utilized to project images on the gaming surface and to track players' interactions with the projections. In additional embodiments, objects or other items associated with the gaming device may be tracked by the system (e.g., wagering chips, drinks, roulette balls, dice, bet markers, the front and/or backs of playing cards, and other personal items placed on the surface by the players, etc.). For example, the number of cards (e.g., and the value/rank of the cards) may be tracked based on the rule of the game being implemented.

In some embodiments, images may be projected in association with the tracked objects or other items. For example, the projection device may be configured (e.g., aligned) to project one or more images at certain locations or around certain object on the gaming surface. As above, the projection device may be aligned with areas where wagers are to be made such that the images may appear to interact with wagers as they are placed in the designated wagering areas. For example, the projection device may be aligned with areas that are marked on the gaming table (e.g., printed boundaries of wager, cards, and/or other item areas). In some embodiments, the projection device may define, supplement, and/or duplicate the boundaries of such area on the gaming surface. Additional embodiments may include similar alignments with other objects and/or areas on the gaming surface (e.g., chip stack, card, print on felt) where the system is aligned such that the images projected may interact (e.g., visually appear to interact) with the objects and/or areas.

While some of the example embodiments have been described with relation to a gaming environment, it will be appreciated that the above concepts can also be used in various non-gaming environments. For example, such monitoring and associated inceptives and/or rewards can be used in conjunction with purchasing products, e.g., gasoline or groceries, associated with vending machines, used with mobile devices or any other form of electronic communications. Accordingly, the disclosure may be implemented on or by, but should not be limited strictly to, gaming casinos, arcades, portal based game sites, cellular phone devices, personal digital assistant devices, laptops, personal computers, home game consoles, bar top gaming devices, table gaming devices, surface computing devices, table gaming biometric touch screen, television gaming, or in-room gaming devices.

In some embodiments, the instant disclosure may provide information relating to a patron or player in a gaming establishment over an array of gaming and non-gaming offerings to enable analysis of specific buying and/or gaming habits, such as whether a specific player exhibits any particular patterns, whether the player prefers a specific game, how often the player purchases, and whether the player is a high value customer. Other valuable business intelligence data obtained in such systems and related methods may enable the capturing of information on retail statistics as they relate to demographic based player habits according to gender and approximate age. For example, embodiments of the instant disclosure may implement the use of biometric data to provide a low-friction approach to accessing patron loyalty systems (e.g., with anonymous or known players) in order to provide rewards and/or to tailor marketing of gaming products according to player preferences. Further, biometric data may enhance security systems related to various gaming products. Gaming and non-gaming environments, such as casinos, lottery establishments, race tracks, grocery or convenience stores, retail stores, public events, and restaurants, may similarly benefit from the collection of facial biometric data.

In some embodiments, the instant disclosure may provide the ability to enhance player experiences at gaming devices by monitoring items associated with the gaming device and/or by monitoring movement of the players at the gaming device. In some embodiments, features associated with a wagering game (e.g., a prize or spin wheel) may be virtually projected on a gaming surface. The tracking of player movements may enable the players to interact with the virtual, projected feature as if it was a physical part of the gaming device (e.g., to spin the prize wheel for a bonus). Further, some embodiments may be utilized to track items on a gaming surface (e.g., one or a stack of wagering chips), and/or players interactions on the gaming surface or with items thereon, to monitor certain objects on the gaming surface as the players interact with the objects (e.g., in order to verify wagers as they are placed on the wagering surface and/or monitor/verify hands of cards on the table).

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

Non-limiting, example embodiments are listed below.

Embodiment 1: A method of monitoring a patron in a gaming establishment, the method comprising: at a first gaming location in the gaming establishment, detecting, with a detection device, at least one physical feature associated with the patron of the gaming establishment; receiving, at a processor, the at least one detected physical feature; analyzing, with the processor, at least a portion of the at least one detected physical feature to identify a patron; associating, with the processor, data from the first gaming location with an account associated with the patron; at a second non-gaming location in the gaming establishment, detecting, with another detection device, the at least one physical feature associated with the patron of the gaming establishment; receiving, at the processor, the at least one detected physical feature; analyzing, with the processor, the at least a portion of the at least one detected physical feature to identify the patron; and adding additional data from the second non-gaming location to the account associated with the patron.

Embodiment 2: The method of Embodiment 1, further comprising: configuring the account to initially lack any personal data related to the patron; updating the account with personal information related to the patron to create a known account; and providing information to the patron relating to the known account via a device linked to the known account.

Embodiment 3: A system for monitoring a patron in a gaming establishment, the system comprising: a biometric identification device; a remote processor; and a gaming device; the system configured to: at the gaming device in the gaming establishment, detect, with the biometric identification device, facial features associated with a patron at the gaming establishment; receive, at the remote processor, the facial features and data relating to actions of the patron at the gaming device; analyze, with the remote processor, at least a portion of the facial features; determine whether an account associated with the patron exists based on the analyzing of the facial features; and associate the data relating to actions of the patron at the gaming device with the account associated with the patron.

Embodiment 4: The system of Embodiment 3, wherein the system is further configured to: update the account with personal information related to the patron to create a known account; and send information to the patron relating to the known account via a device linked to the known account.

Embodiment 5: A method of administering a game, the method comprising: displaying, with a display device, a feature of the game at a display location on a gaming surface of a gaming device upon which the game is implemented; tracking, with one or more identification devices, motions of one or more players participating in the game at the gaming surface of the gaming device; and in response to the motions of the one or more players proximate the display location, altering the projected feature of the game with the display device.

Embodiment 6: The method of Embodiment 5, wherein altering the feature of the game with the display device comprises moving the feature of the game comprising a prize wheel in correlation with motions of the one or more players proximate the prize wheel.

Embodiment 7: The method of Embodiment 6, further comprising enabling the one or more players to spin the prize wheel and projecting a result of the spin.

Embodiment 8: The method of Embodiments 6 or 7, further comprising, once a hand of the one or more players has traveled within a threshold volume proximate the prize wheel, locking movement of the prize wheel to further movement of the hand of the one or more players.

Embodiment 9: The method of any one of Embodiments 5 through 8, further comprising: aligning the feature of the game with one or more areas of the gaming surface; and projecting the feature of the game at the one or more areas of the gaming surface in response to an occurrence of selected event in the game.

Embodiment 10: The method of any one of Embodiments 5 through 8, wherein altering the feature of the game with the display device comprises displaying a video element on the gaming surface of the gaming device along with accompanying audio.

Embodiment 11: The method of any one of Embodiments 5 through 8, wherein tracking motions of the one or more players comprising: monitoring the one or more players placing a wager with the one or more identification devices; and projecting the feature of the game in response to placement of the wager at a select location on the gaming surface.

Embodiment 12: The method of any one of Embodiments 5 through 8, further comprising monitoring at least one additional element associated with the gaming device with the one or more identification devices.

Embodiment 13: The method of Embodiment 12, wherein monitoring the at least one additional element comprising detecting, with the one or more identification devices, an amount of a wager placed by the one or more player by analyzing one or more wagering chips.

Embodiment 14: The method of Embodiments 12 or 13, further comprising detecting, with the one or more identification devices, biometric information from the one or more players.

Embodiment 15: A system for administering a wagering game, the system comprising: a gaming device having a gaming surface for performing the wagering game thereon; a display device positioned proximate the gaming surface and configured to display one or more images on the gaming surface; and one or more identification devices; the system configured to: detect, with the one or more identification devices, a feature associated with a player participating in the wagering game at the gaming surface; and, in response to detection the feature associated with the player participating in the wagering game, project, with the display device, a feature of the wagering game at a display location on the gaming surface.

Embodiment 16: The system of Embodiment 15, wherein the system is further configured to: align the one or more images with one or more areas of the gaming surface; and projecting the one or more images at the one or more areas of the gaming surface in response to an occurrence of selected event in the game.

Embodiment 17: The system of Embodiments 15 or 16, wherein the display device comprises a projection device.

What is claimed is:

1. A method of monitoring a patron in a gaming establishment, comprising:
    at a first gaming location in the gaming establishment, detecting, with a detection device, at least one physical feature associated with the patron of the gaming establishment;
    receiving, at a processor, the at least one detected physical feature;
    analyzing, with the processor, at least a portion of the at least one detected physical feature to anonymously identify a patron;
    associating, with the processor, data from the first gaming location with an anonymous account associated with the patron;
    at a second non-gaming location in the gaming establishment, detecting, with another detection device, the at least one physical feature associated with the patron of the gaming establishment;
    receiving, at the processor, the at least one detected physical feature;
    analyzing, with the processor, the at least a portion of the at least one detected physical feature to identify the patron; and
    adding additional data from the second non-gaming location to the account associated with the patron; and
    updating the anonymous account with personal information provided by the patron to create a known account.

2. The method of claim 1, wherein analyzing the at least a portion of the at least one detected feature comprising comparing, with the processor, the at least a portion of the at least one detected feature comprising at least one image with a database of stored images.

3. The method of claim 2, further comprising detecting a match between the at least one image and the stored images.

4. The method of claim 2, wherein comparing the at least a portion of the at least one detected feature comprises utilizing machine learning to identify the at least a portion of the at least one detected feature.

5. The method of claim 1, further comprising obtaining biometric information from the patron with the detection device comprising a biometric identification device.

6. The method of claim 5, further comprising providing facial recognition images of the patron from the biometric information with the detection device.

7. The method of claim 6, further comprising:
communicating the at least a portion of the at least one detected physical feature to a cloud server; and
analyzing the facial recognition images with the cloud server; and
returning data from the cloud server indicating whether a match for the at least a portion of the at least one detected physical feature was found in the cloud server.

8. A method of monitoring a patron in a gaming establishment, comprising:
at a first gaming location in the gaming establishment, detecting, with a detection device, at least one physical feature associated with the patron of the gaming establishment;
receiving, at a processor, the at least one detected physical feature;
analyzing, with the processor, at least a portion of the at least one detected physical feature to identify a patron;
associating, with the processor, data from the first gaming location with an account associated with the patron;
at a second non-gaming location in the gaming establishment, detecting, with another detection device, the at least one physical feature associated with the patron of the gaming establishment;
receiving, at the processor, the at least one detected physical feature;
analyzing, with the processor, the at least a portion of the at least one detected physical feature to identify the patron; and
adding additional data from the second non-gaming location to the account associated with the patron.

9. The method of claim 8, further comprising:
configuring the account to initially lack any personal data related to the patron;
updating the account with personal information related to the patron to create a known account; and
providing information to the patron relating to the known account via a device linked to the known account.

10. The method of claim 8, wherein detecting the at least one physical feature associated with the patron of the gaming establishment comprises obtaining biometric information from the patron with the detection device comprising a biometric identification device.

11. A system for monitoring a patron in a gaming establishment, comprising:
a biometric identification device;
a remote processor; and
a gaming device;
the system configured to:
at the gaming device in the gaming establishment, detect, with the biometric identification device, facial features associated with a patron at the gaming establishment;
receive, at the remote processor, the facial features and data relating to actions of the patron at the gaming device;
analyze, with the remote processor, at least a portion of the facial features;
determine whether an account associated with the patron exists based on the analyzing of the facial features; and
associate the data relating to actions of the patron at the gaming device with the account associated with the patron.

12. The system of claim 11, wherein the system is further configured to:
update the account with personal information related to the patron to create a known account; and
send information to the patron relating to the known account via a device linked to the known account.

13. A method of administering a game, the method comprising:
displaying, with a display device, a feature of the game at a display location on a gaming surface of a gaming device upon which the game is implemented;
tracking, with one or more identification devices, motions of one or more players participating in the game at the gaming surface of the gaming device; and
in response to the motions of the one or more players proximate the display location, altering the feature of the game with the display device.

14. The method of claim 13, wherein altering the feature of the game with the display device comprises moving the feature of the game comprising a prize wheel in correlation with motions of the one or more players proximate the prize wheel.

15. The method of claim 14, further comprising enabling the one or more players to spin the prize wheel and projecting a result of the spin.

16. The method of claim 14, further comprising, once a hand of the one or more players has traveled within a threshold volume proximate the prize wheel, locking movement of the prize wheel to further movement of the hand of the one or more players.

17. The method of claim 13, further comprising:
aligning the feature of the game with one or more areas of the gaming surface; and
projecting the feature of the game at the one or more areas of the gaming surface in response to an occurrence of selected event in the game.

18. The method of claim 13, wherein altering the feature of the game with the display device comprises displaying a video element on the gaming surface of the gaming device along with accompanying audio.

19. The method of claim 13, wherein tracking motions of the one or more players comprising:
monitoring the one or more players placing a wager with the one or more identification devices; and
projecting the feature of the game in response to placement of the wager at a select location on the gaming surface.

20. The method of claim 13, further comprising monitoring at least one additional element associated with the gaming device with the one or more identification devices.

21. The method of claim 20, wherein monitoring the at least one additional element comprising detecting, with the one or more identification devices, an amount of a wager placed by the one or more player by analyzing one or more wagering chips.

22. The method of claim 20, further comprising detecting, with the one or more identification devices, biometric information from the one or more players.

23. A system for administering a wagering game, the system comprising:
a gaming device having a gaming surface for performing the wagering game thereon;

a display device positioned proximate the gaming surface and configured to display one or more images on the gaming surface; and one or more identification devices;

the system configured to:
- detect, with the one or more identification devices, a feature associated with a player participating in the wagering game at the gaming surface; and
- in response to detection the feature associated with the player participating in the wagering game, project, with the display device, a feature of the wagering game at a display location on the gaming surface.

24. The system of claim 23, wherein the system is further configured to:
- align the one or more images with one or more areas of the gaming surface; and
- project the one or more images at the one or more areas of the gaming surface in response to an occurrence of selected event in the game.

25. The system of claim 23, wherein he display device comprises a projection device.

\* \* \* \* \*